United States Patent [19]

Bodmer

[11] 4,165,102

[45] Aug. 21, 1979

[54] METHOD OF PREPARING ZINC-MODIFIED PHENOL-ALDEHYDE NOVOLAK RESINS AND USE AS A COLOR-DEVELOPER

[75] Inventor: Jerome R. Bodmer, Appleton, Wis.

[73] Assignee: NCR Corporation, Dayton, Ohio

[21] Appl. No.: 911,208

[22] Filed: May 31, 1978

[51] Int. Cl.[2] .......................... B41L 1/36; B41M 5/16; C08G 8/28; C08G 8/32

[52] U.S. Cl. .................................. 282/27.5; 260/29.3; 428/307; 428/327; 528/162; 525/504; 525/506; 525/936

[58] Field of Search ................. 260/51 R, 53 R, 59 R, 260/29.3; 428/307; 528/132, 134, 162; 282/27.5

[56] References Cited

U.S. PATENT DOCUMENTS

| | | | |
|---|---|---|---|
| 3,732,120 | 5/1973 | Brockett et al. | 260/59 R X |
| 3,737,410 | 6/1973 | Meuller | 260/59 R |
| 3,817,922 | 6/1974 | Barth | 260/53 R |
| 4,025,490 | 5/1977 | Weaver | 260/51 R X |
| 4,027,065 | 5/1977 | Brockett et al. | 428/307 |
| 4,082,713 | 4/1978 | Kelley | 282/27.5 X |
| 4,121,013 | 10/1978 | Miller et al. | 282/27.5 X |

*Primary Examiner*—Howard E. Schain
*Attorney, Agent, or Firm*—Birch, Stewart, Kolasch and Birch

[57] ABSTRACT

A method of making zinc-modified phenol-aldehyde novolak resins for use as a color-developing agent in pressure-sensitive record sheet material involving the addition of certain dry particulate zinc compounds and an ammonium carboxylate to the melted resin. Specifically, a phenol-formaldehyde resin is reacted with zinc oxide or zinc carbonate and ammonium benzoate.

25 Claims, No Drawings

METHOD OF PREPARING ZINC-MODIFIED PHENOL-ALDEHYDE NOVOLAK RESINS AND USE AS A COLOR-DEVELOPER

BACKGROUND OF THE INVENTION

The present invention relates to zinc-modified phenol-aldehyde novolak resins, and more particularly, to an improved method for making zinc-modified phenol-aldehyde novolak resins which are particularly useful in carbonless copy paper manifold systems as color-developing agents (coreactants) for colorless chromogenic materials.

The carbonless manifold systems generally comprise a substantially colorless developing agent, a substantially colorless chromogenic material and a common solvent or solvent mixture for each. The color-developing agents in the chromogenic material are isolated from each other on the surface of a substrate such as paper. The solvent may be isolated from each of the other ingredients or may contain either ingredient, usually the chromogenic material, in solution. Preferably, the colorless chromogenic material and the solvent are encapsulated in microcapsules as disclosed in U.S. Pat. Nos. 2,800,457; 3,041,289; 3,533,958 and 4,001,140. The configuration and relationship of either reactive component in the solvent can be any of those disclosed in U.S. Pat. No. 3,672,935. The microcapsules containing a solution of the colorless chromogenic material may be applied with an adhesive or binder to one surface of a substrate such as paper. The color-developing agent may be applied as a coating to a second substrate, either alone or mixed with other ingredients such as adhesives or binders and mineral particles. When the two substrates are superimposed one on the other with the coated surfaces in contact with each other and then subjected to pressure, the microcapsules are ruptured in the configuration of the applied pressure, and the solution of colorless chromogenic material is transferred in the same configuration to the surface of the substrate containing the coating of the color-developing agent to form a colored mark on the surface, again in the configuration of the applied pressure. The microcapsules and color-developing agent may also be applied to the same surface of a substrate such as paper either as a mixture or as separate coatings. Pressure applied to several of these sheets superimposed one on the other produces a mark in the pattern of the indicia of the applied pressure. Other configurations include microcapsules containing a solution of the color-developing agent in which case the colorless chromogenic material is applied as a second coating to the same or a different substrate.

Zinc-modified phenol-aldehyde novolak resins and methods of producing such resins for use as a color-developing agent for basic colorless chromogenic materials are known. U.S. Pat. No. 3,732,120 discloses a method of making such zinc-modified phenol-aldehyde novolak resins wherein a zinc compound such as zinc dibenzoate is added to a para-substituted phenol-aldehyde novolak resin. The resulting zinc-modified novolak resin is cooled, ground and then coated onto a paper substrate in one or more of the configurations previously described. Improved resistance to print fade and increased color intensity were obtained by the use of the zinc-modified resin product when compared to the novolak resin material alone as a color-developing agent for oil-soluble basic colorless chromogenic materials in carbonless copy paper manifold systems.

U.S. Pat. No. 3,737,410 discloses a method of making zinc-modified para-substituted phenol-formaldehyde novolak resins which comprises mixing together and heating a zinc compound such as zinc dibenzoate, a weak base such as ammonium bicarbonate and an unmodified phenol-aldehyde resin material. Again, the resulting zinc-modified novolak resin provides improved color intensity and fade resistance as well as increased print speed and improved resistance to coreactant-surface sensitivity.

U.S. Pat. No. 4,025,490 discloses a similar method of producing zinc-modified para-substituted phenol-formaldehyde novolak resins comprising melting together with mixing, a composition of a material such as zinc formate, ammonia or an ammonium compound such as ammonium carbonate, and a para-substituted phenol-aldehyde novolak resin. It is stated that the resulting zinc-modified resin material provides an improved rate of color image development, fade resistance, and storage stability in a carbonless copy paper manifolding system prior to imaging the coreactant surface. It is also disclosed that the inclusion of the weak ammonium compound (ammonium carbonate) or ammonia gas suppresses the formation of metal oxide during the melting process. The metal oxide formed during the melting in effect prevents that portion of the metal from entering into modification of the novolak resin.

SUMMARY OF THE INVENTION

Accordingly, an object of the present invention is to provide an improved method of making zinc-modified phenol-aldehyde novolak resins for use as a color developing agent in pressure-sensitive record sheet material.

Another object of the invention is to provide zinc-modified para-substituted phenol-formaldehyde resins which are resistant to a reduction of reactivity of the receiver sheet as a result of the wet coating having been dried in contact with a heating means such as a heated drum drier.

A further object of the present invention is to provide an improved method of making zinc-modified phenol-aldehyde novolak resins which, when used in a coating applied to a substrate, produces a reactive surface capable of developing images which exhibit excellent light stability (fade resistance).

These and other objects and advantages of the present invention will become apparent to those skilled in the art from a consideration of the following specification and claims.

The present invention comprises a method of producing a zinc-modified phenol-formaldehyde novolak resin by reacting an unmodified phenol-formaldehyde resin with a specific, dry particulate zinc compound and an ammonium carboxylate salt in dry particulate form. Specifically, the unmodified phenol-formaldehyde is reacted with zinc oxide or zinc carbonate and ammonium benzoate in solid particulate form. This reaction can be accomplished by adding the zinc compound selected from zinc oxide and zinc carbonate and the ammonium benzoate either to a novolak resin still in the liquid state from its preparation or to a novolak resin which has been melted. The mixture is reacted at a temperature of about 155°–170° C. and for a sufficient time to achieve the modification of the phenol-formaldehyde resin with the zinc compound. The resulting zinc-modified novolak resin is then cooled and ground with a small amount of dispersant and water. Advantageously, the mixture is reacted for about 45 to 90 minutes.

The use of the specific zinc-containing compounds provides a zinc-modified novolak resin which reacts with a colorless chromogenic material to develop an image which exhibits an excellent light stability (fade resistance). Moreover, the use of the zinc-modified novolak resin of the present invention in receiver sheet coatings results in improved retention of reactivity when these coatings are dried in contact with a heated drum drier.

As aforementioned, the specific zinc-containing compounds useful in the present method are zinc oxide and zinc carbonate. Zinc oxide is the preferred zinc compound.

The phenol-formaldehyde novolak resins employed in the present invention preferably are substituted in the para-position of the phenol moiety. Particularly desirable novolak resins are para-octylphenol-formaldehyde resins, para-nonylphenol-formaldehyde resins, para-tertiary-butylphenol-formaldehyde resins and para-phenylphenol-formaldehyde resins. Of course, the most preferred of the para-substituted novolak resins is para-octylphenol-formaldehyde resin. Other phenol-aldehyde novolak resins useful in this invention are disclosed in the aforementioned U.S. Pat. No. 3,732,120.

The ammonium compound utilized in the present invention is ammonium benzoate.

The phenol-aldehyde novolak resin is preferably used in the liquid state to which is added the dry particulate zinc material and the dry particulate ammonium material, the latter two compounds being added as a dry substantially homogeneous mixture. Particularly desirable results are achieved when the ammonium compound is present in an amount of about 2.85 to 11.28% by dry weight based upon the dry weight of the phenol-aldehyde novolak resin, preferably about 4.00 to 6.75% by dry weight. Likewise, particularly desirable results are achieved when the zinc material is present in an amount of about 1.85 to 7.24% by dry weight based upon the dry weight of the phenol-aldehyde novolak resin, preferably about 2.00 to 6.75% by dry weight. More preferably, the zinc material and the ammonium material are added simultaneously.

During the entire preparation process of this invention, it is preferable to carry out the process in an inert atmosphere, for example, under a blanket of inert nitrogen or helium gas. In general, a stream of such inert gas is made to flow over the surface of the reaction mixture in a closed reaction vessel.

EXAMPLES OF THE INVENTION

The following examples are given merely as illustrative of the present invention and are not to be considered as limiting. Unless otherwise noted, the percentages therein and throughout the application are by weight.

The test results shown therein are determined in the following manner.

The typewriter intensity (TI) and calender intensity (CI) tests are measures of responses of carbonless paper to deliberate marking pressures. In the Typewriter Intensity (TI) test, a standard pattern is typed on a CF-CB (coated front-coated back) pair. The reflectance of the printed area is a measure of color development on the CF sheet and is reported as the ratio of the reflectance of the printed area to that of the untyped area ($I/I_o$) and is expressed as a percentage. A high value indicates little color development and a low value indicates good color development. The faded print intensity is measured in the same manner.

A CI test is essentially a rolling pressure test as opposed to the impact pressure of the TI test and is conducted to determine the amount of color developed from the transfer of marking liquid obtained by such rolling pressure. Again, the results are reported as the ratio of the reflectance of the marks produced on the CF sheet as compared to the background reflectance of the paper ($I/I_o$) expressed as a percentage. In both the TI and CI test results the lower the value, the more intense the mark and the better the system as to visibility.

Typewriter and Calender Intensity tests are also conducted before and after exposure of the print as well as after exposure of the CF sheet itself at the noted times to fluoroescent light and within an oven. The fluoroescent light test device comprises a light box containing a bank of 18 daylight fluorescent lamps (21 inches long, 13 nominal lamp watts) vertically mounted on 1-inch centers placed 1½ inches from the sample being exposed.

EXAMPLES 1-10

The following procedure is used to prepare the various zinc modification formulations shown in Table I.

Para-octylphenol-formaldehyde resin (POP resin) is melted in a heated reaction kettle and brought to 155° C. The dry zinc compounds and the ammonium benzoate are completely mixed together before use, and slowly added over an 8 minute period to the melted resin. This mixture is reacted for an additional 52 minutes at a temperature range of 158° C. to 165° C. During the entire reaction period, the vapor above the melt is alkaline as evidenced by moistened litmus paper. After the allotted reaction time, the zinc modified resin is poured from the kettle into an aluminum tray and cooled. No residual zinc modifying materials can be seen on the kettle bottom. The cooled resin itself is clear, indicating that complete reaction has occurred.

The prepared zinc-modified POP resins are individually dispersed in an attritor by grinding a 54% aqueous mixture comprised of a small amount of dispersant and the zinc-modified resin. Each resin dispersion is then evaluated in the following coating mixture:

67.9 parts kaolin clay
6.0 parts calcium carbonate
6.5 parts hydroxyethyl starch
13.6 parts zinc-modified resin dispersion
6.0 parts styrene-butadiene latex and enough water to make a 30% solids coatings. The coatings are applied to a suitable paper substrate in an amount of 4.5 to 5.0 pounds per ream (3300 square feet) with a No. 10 wire-wound coating rod and dried.

TABLE I

| Materials / Example No. | Formulations for Zinc Modification of Phenolic Resins (parts by weight) 1 | 2 | 3 | 4 | 5 | 6 | 7 | 8 | 9 | 10 |
|---|---|---|---|---|---|---|---|---|---|---|
| POP Resin | 200 | 200 | 200 | 200 | 200 | 200 | 200 | 200 | 200 | 200 |
| Ammonium Benzoate | 13.5 | 13.5 | 13.5 | 13.5 | 13.5 | 13.5 | 7.5 | 9.5 | 11.5 | 7.5 |
| *ZnO (St. Joe 321) | — | — | — | 4.0 | — | — | 7.2 | 7.2 | 7.2 | — |

TABLE I-continued

| Materials | Formulations for Zinc Modification of Phenolic Resins (parts by weight) Example No. 1 | 2 | 3 | 4 | 5 | 6 | 7 | 8 | 9 | 10 |
|---|---|---|---|---|---|---|---|---|---|---|
| *ZnO (St. Joe 920-21) | 7.2 | 7.2 | 4.5 | — | 4.0 | — | — | — | — | — |
| ZnO (63 HS) | — | — | — | — | — | 7.2 | — | — | — | 7.2 |

*(supplied by St. Joe Minerals Corp., New York, N. Y.)
**(high surface area zinc oxide supplied by Sherwin-Williams Company, Cleveland, Ohio)

The coated sheets are tested with a standard CB paper (described in U.S. Pat. No. 3,732,120, namely, paper sheets coated with gelatin capsules containing oily solution droplets of a substantially colorless chromogeneous dry precursor mixture comprising 1.7% of Crystal Violet Lactone (CVL), 0.55% of 3,3-bis(1-ethyl-2-methylindol-3-yl) phthalide (Indolyl Red), 0.55% of 2'-anilino-6'-diethylamino-3'-methylfluoran (N-102) and 0.50% of benzoyl leuco methylene blue (BLMB). The zinc-modified POP resins produce a reactive CF receiver surface capable of developing an image which exhibits excellent light stability or fade resistance as shown by the data presented in Table II.

TABLE II

| | Zn Dibenzoate POP Control | Example Nos. 1 | 2 | 3 | 4 | 5 |
|---|---|---|---|---|---|---|
| C.I. Initial | | | | | | |
| 15 sec. | 49 | 49 | 47 | 48 | 52 | 51 |
| 30 sec. | 48 | 47 | 46 | 47 | 51 | 50 |
| 60 sec. | 48 | 47 | 44 | 47 | 49 | 49 |
| 10 min. | 46 | 45 | 43 | 47 | 48 | 49 |
| C.I. Fluorescent Light Fade (24 hrs.) | 59 (+13) | 55 (+10) | 56 (+13) | 60 (+13) | 61 (+13) | 64 (+15) |
| C.I. Fluorescent Light Decline (24 hrs.) | | | | | | |
| 15 sec. | 52 | 51 | 49 | 51 | 53 | 53 |
| 30 sec. | 49 | 49 | 46 | 48 | 51 | 51 |
| 60 sec. | 47 | 47 | 45 | 47 | 51 | 49 |
| 10 min. | 46 | 47 | 44 | 46 | 48 | 48 |
| C.I. Heat Decline at 140° F. (24 hrs.) | | | | | | |
| 15 sec. | 52 | 52 | 49 | 53 | 49 | 51 |
| 30 sec. | 51 | 49 | 47 | 51 | 47 | 49 |
| 60 sec. | 47 | 48 | 47 | 50 | 47 | 48 |
| 10 min. | 47 | 48 | 45 | 48 | 46 | 47 |
| T.I. Initial (20 min.) | 30 | 29 | 34 | 36 | 36 | 36 |
| T.I. Fluorescent Light Fade (24 hrs.) | 40 (+10) | 36 (+7) | 43 (+9) | 48 (+12) | 55 (+19) | 55 (+19) |
| T.I. Fluorescent Light Decline (24 hrs.) | 31 (+1) | 30 (+1) | 36 (+2) | 38 (+2) | 38 (+2) | 38 (+2) |

Footnotes:
(a) The numbers in parentheses represent changes in the measured property as a result of the indicated test conditions.
(b) In the C.I. Initial test, the CI values are read at 15, 30 and 60 seconds and at 10 minutes after printing. The prints are then placed in the light box for 24 hours at which time the CI values are read to give the CI Fluorescent Light Fade values.
(c) The CI Fluorescent Light Decline and CI Heat Decline values are read at 15, 30 and 60 seconds and at 10 minutes after first exposing the CF sheets per se to the light box and within the oven for 24 hours, respectively, before making the print thereon.
(d) The TI Initial value is read 20 minutes after printing. A time of 20 minutes is chosen so that all prints will be fully developed and differencess in print speed will not be erroneously and differences in print speed will not be erroneously reflected in print intensity data. The prints are then placed in the light box for 24 hours at which time the TI values are read to give the TI Fluorescent Light Fade Values.
(e) The TI Fluorescent Light Decline values are obtained by first exposing the CF sheets per se to the light box and the reading then TI values 20 minutes after printing thereon.

The CI data in Table II show that the CF sheets made in accordance with the present invention exhibit an excellent fade resistance or light stability. Thus, it is clear that the zinc-modified phenol-aldehyde novolak resins made in accordance with the present invention provide a reactive CF receiver surface having excellent print fade resistance when used in a carbonless copy paper system.

A significant advantage obtained with the zinc oxide-modified novolak resin of the invention is its resistance to reduction of reactivity of coated sheets comprising zinc-modified novolak resins when the coatings are dried with the sheets in contact with a heating means such as a heated drum. The requirement to withstand heated drum driers is encountered in certain production equipment and zinc-modified novolak resins exhibiting this resistance to reduction in reactivity are particularly useful in such a situation. This retention of reactivity is not retained with the zinc dibenzoate-modified resin as shown by the data presented in Table III.

TABLE III

| | | Method of Drying CF Coating Hot Air | Heated Drum (greater than 200° F. | 10 min. CI |
|---|---|---|---|---|
| Zn Dibenzoate POP Control | 10 min. CI | 44 | 50 | +6 |
| Example 2 | 10 min. CI | 43 | 47 | +4 |
| Example 3 | 10 min. CI | 46 | 48 | +2 |
| Example 4 | 10 min. CI | 48 | 49 | +1 |
| Example 5 | 10 min. CI | 49 | 51 | +2 |

TABLE III-continued

| | | Method of Drying CF Coating | | |
|---|---|---|---|---|
| | | Hot Air | Heated Drum (greater than 200° F. | 10 min. CI |
| Example 6 | 10 min. CI | 43 | 44 | +1 |
| Example 7 | 10 min. CI | 41 | 46 | +5 |
| Example 8 | 10 min. CI | 42 | 43 | +1 |
| Example 9 | 10 min. CI | 41 | 42 | +1 |
| Example 10 | 10 min. CI | 44 | 43 | −1 |

Table III shows that zinc-modified novolak resins prepared according to the present invention are resistant to a reduction in reactivity upon drying of the coated receiver sheets by means of a heated drum. Examples 2–10 show a reduction of an average of 1.8 CI units upon such drying while the zinc dibenzoate-modified control lost 6 units.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method of making a zinc-modified phenol-aldehyde novolak resin which comprises mixing together and heating a solid particulate zinc compound selected from the group consisting of zinc oxide and zinc carbonate, ammonium benzoate in solid particulate form, and a phenol-aldehyde novolak resin material.

2. The method of claim 1, in which the resin material is in the form of a melt.

3. The method of claim 2, in which the zinc compound and the ammonium benzoate are mixed prior to the mixing and heating with the resin material.

4. The method of claim 3, comprising additionally cooling the resulting zinc-modified phenol-aldehyde novolak resin until it is a solid material and grinding the resulting solid material.

5. The method of claim 1, in which the zinc compound is zinc oxide.

6. The method of claim 2, in which the zinc compound is zinc oxide.

7. The method of claim 1, in which the resin material is a para-substituted phenol-formaldehyde novolak resin.

8. The method of claim 2, in which the resin material is a para-substituted phenol-formaldehyde novolak resin.

9. The method of claim 8, in which the para-substituent of the resin is a substituent selected from the group consisting of tertiary-butyl, octyl, nonyl, phenyl and mixtures thereof.

10. The method of claim 9, in which the resin is a para-octylphenol-formaldehyde resin.

11. A method of making a zinc-modified para-octylphenol-formaldehyde novolak resin which comprises adding a mixture of a solid particulate zinc oxide and a solid particulate ammonium benzoate to a liquid para-octylphenyl-formaldehyde novolak resin, and heating the resulting mixture to produce the zinc-modified resin.

12. An aqueous coating slurry comprising water and a zinc-modified phenol-aldehyde novolak resin prepared in accordance with the method of claim 1.

13. The aqueous coating slurry of claim 12, wherein the zinc-modified resin is a para-substituted phenol-formaldehyde novolak resin.

14. The aqueous coating slurry of claim 12, wherein the zinc-modified resin is a para-octylphenol-formaldehyde resin.

15. A substrate having a coating on at least one surface thereof comprising a zinc-modified phenol-aldehyde novolak resin prepared in accordance with the method of claim 1.

16. A substrate having a coating thereon in accordance with claim 15, wherein the zinc-modified resin is a para-substituted phenol-formaldehyde novolak resin.

17. A substrate having a coating thereon in accordance with claim 15, wherein the zinc-modified resin is a para-octylphenol-formaldehyde resin.

18. A pressure-sensitive record material comprising a first substrate having a coating of pressure rupturable capsules containing an oily solution of a substantially colorless chromogenic material and in face-to-face relationship therewith a second substrate having a coating comprising a zinc-modified phenol-aldehyde novolak resin prepared in accordance with the method of claim 1.

19. The pressure-sensitive record material of claim 18, wherein the zinc-modified resin is a para-substituted phenol-formaldehyde novolak resin.

20. The pressure-sensitive record material of claim 18, wherein the zinc-modified resin is a para-octylphenol-formaldehyde resin.

21. A manifold assembly comprising a plurality of coated first and second substrates as defined in claim 18.

22. A method of making a zinc-modified phenol-aldehyde novolak resin which comprises mixing together and heating about 1.85 to 7.24% dry weight, based upon the dry weight of the phenol-aldehyde novolak resin, of a dry particulate zinc compound selected from the group consisting of zinc oxide and zinc carbonate, about 2.85 to 11.28% dry weight, based upon the dry weight of said novolak resin, of dry particulate ammonium benzoate, and a liquid phenol-aldehyde novolak resin material.

23. The method of claim 22, in which the amount of zinc compound employed is about 2.00 to 6.75% dry weight.

24. The method of claim 22, in which the amount of ammonium benzoate employed is about 4.00 to 6.75% dry weight.

25. The method of claim 22, in which the resin material is a para-substituted phenol-formaldehyde novolak resin.

* * * * *